Sept. 27, 1960 M. CANEPA 2,954,267

MODIFIED RETURN-TO-ZERO DIGITAL RECORDING SYSTEM

Filed June 5, 1958 4 Sheets-Sheet 1

INVENTOR.
MICHELE CANEPA
BY
Kenyon & Kenyon
ATTORNEYS

Sept. 27, 1960 M. CANEPA 2,954,267

MODIFIED RETURN-TO-ZERO DIGITAL RECORDING SYSTEM

Filed June 5, 1958 4 Sheets-Sheet 2

INVENTOR.
MICHELE CANEPA
BY
Kenyon & Kenyon
ATTORNEYS

MODIFIED RETURN-TO-ZERO DIGITAL RECORDING SYSTEM

Filed June 5, 1958 4 Sheets-Sheet 3

INVENTOR.
Michele Canepa
BY
Kenyon & Kenyon
ATTORNEYS

Sept. 27, 1960 M. CANEPA 2,954,267

MODIFIED RETURN-TO-ZERO DIGITAL RECORDING SYSTEM

Filed June 5, 1958 4 Sheets-Sheet 4

INVENTOR.
MICHELE CANEPA
BY Kenyon & Kenyon
ATTORNEYS

United States Patent Office 2,954,267

Patented Sept. 27, 1960

2,954,267

MODIFIED RETURN-TO-ZERO DIGITAL RECORDING SYSTEM

Michele Canepa, South Norwalk, Conn., assignor to Olivetti Corporation of America, New York, N.Y., a corporation of Massachusetts Filed June 5, 1958, Ser. No. 739,998

3 Claims. (Cl. 346—74)

The present invention relates generally to magnetic digital recording techniques and more particularly to a digital recording system having improved signal-to-noise characteristics.

Magnetic recording techniques are widely used in digital computers and other data handling devices for internal storage as well as for input-output functions. To record information, the medium or carrier, which may be a magnetic tape or drum, is caused to move past the gap of a recording head energized by the signal currents. Each succeeding element of the carrier is brought into a definite magnetized state, in which it tends to remain upon leaving the recording field. The recorded pattern of remanent magnetization along the carrier is related to the time variation of the signal current, the nature of this relation being determined by the system characteristics. This magnetic pattern is read by moving the carrier past the gap of a reproducing head, which may be similar to the recording head, thereby inducing an output voltage in the coil surrounding the core of the head.

In the recording and reading of digital information in binary form, the output voltage need not be an exact replica of the recording signal voltage, for it is sufficient that the system recognize in a reliable way the value of the digit stored on the carrier. The binary digit signals, which have a generally rectangular wave form, are applied to the recording head and the elementary signals impressed on the carrier passing across the head consist of reversals of magnetization produced by reversing the ampere-turns in the head winding. In reading the information on the carrier, the elementary output signals from the reproducing head are the pulses of E.M.F. produced by the reversals of magnetization on the carrier as it moves past the reproducing head. These output pulses are therefore alternately positive and negative, and while the output signals do not have the exact wave form as the original binary signals, they bear a definite and recognizable relation thereto.

There are several ways in which binary digits can be represented by the recorded signal. The two best known are the so-called return-to-zero and the non-return-to-zero systems. In the return system, the positive or negative output pulses from the playback head are chosen to represent "1" and the pulses of opposing polarity are disregarded, whereas in the non-return system both negative and positive pulses provide information. It is evident that for output pulses of a given width, the recorded digits in the non-return system may be spaced at half the distance possible in the return system, hence this system has the advantage of a higher packing density.

A third known system is the so-called phase-modulation system in which a negative output pulse represents "1" and a positive output pulse represents "0." This system for use on magnetic tape has the disadvantage of producing non-significant signals between the required signals. Hence a gating or strobe signal is necessary which must be sufficiently precise in time to distinguish between significant and non-significant signals.

With respect to the relative complexity of circuits, each of the systems mentioned above entail a reading amplifier for the signals derived from the head, a discriminator which may be part of the amplifier and accepts the smallest possible digit pulse and rejects interference noise and cross-talk, and a shaping network to form a standard output signal. In addition, the phase-modulation system requires strobe signals which must be generated from the clock track in order to interpret the information track signals.

One fundamental problem encountered in all magnetic digital recording systems is that of signal-to-noise ratio in playback, for this factor determines the ultimate operating efficiency of the system. Of the three known recording systems described herein, the phase-modulation system affords the most favorable signal-to-noise ratio in playback of information. However, the relative complexity of this system militates against its usefulness in digital recording, particularly where space and cost factors are important considerations.

In view of the foregoing, it is the principal object of this invention to provide an improved digital recording system having a signal-to-noise ratio which is comparable in quality with a phase-modulation system and yet accomplishes this result with electronic circuits which are relatively simple.

More specifically, it is an object of the invention to provide a system for recording binary information which is similar to that employed in the standard return to zero systems, with the addition of a series of current pulses constantly recording in the zero direction, the additional pulses being interlaced with the information pulses.

Also an object of the invention is to provide a digital recording system of efficient and compact design which may be manufactured at relatively low cost.

For a better understanding of the invention as well as other objects and further features thereof, reference is had to the following detailed description to be read in conjunction with the accompanying drawings, wherein like components in the various views are identified by like reference numerals.

In the drawings:

Fig. 1, A to I, is a series of wave forms illustrative of the operation of a known return-to-zero system.

Fig. 2, A to E, is a series of wave forms illustrative of the operation of a known phase modulation system.

In order to clarify the theory underlying the invention, the standard return-to-zero and phase-modulation systems will first be briefly described as a basis for comparison with the present invention. Since the invention is a modified form of return-to-zero system, the non-return-to-zero system will not be further considered.

It will be assumed for purposes of this discussion that the magnetic medium is a rotary drum having a suspension of powdered magnetic iron-oxide applied thereto as a thin layer. Previously recorded signals are obliterated by magnetic saturation, in which the drum is subjected to a strong magnetic field. The erase head may be constituted by a permanent or D.-C. electromagnet.

Figure 1:
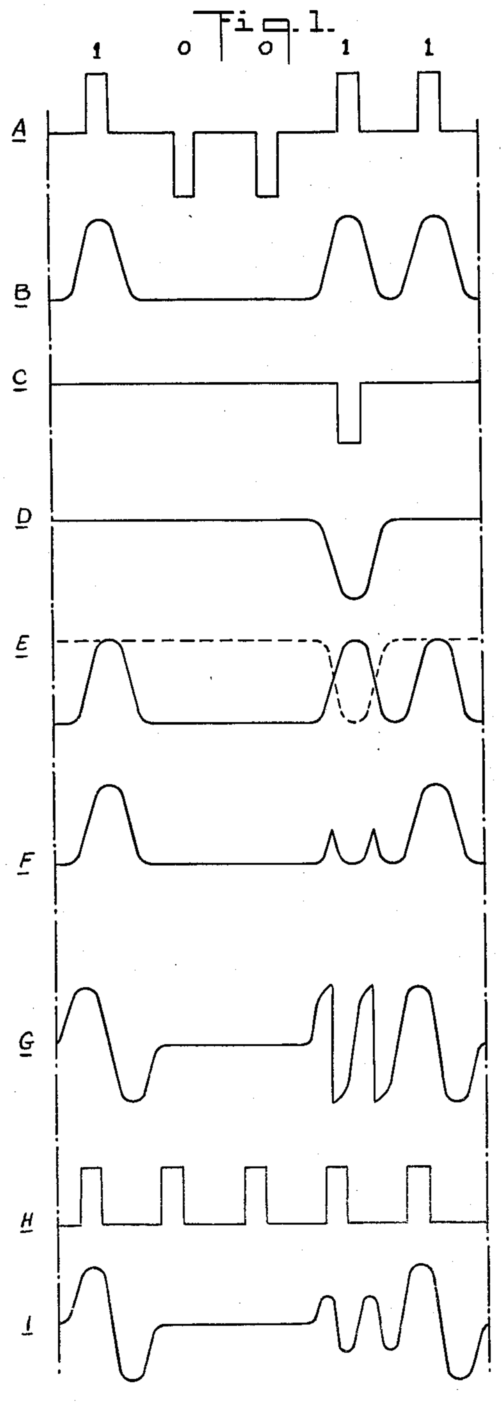

If the magnetic coating on the drum is first biased to saturation in one direction (zero direction) and a current pulse having the binary 10011 configuration as shown in Fig. 1A is then applied to the magnetic recording head, the resultant flux wave form will have approximately the shape shown in 1B.

In Fig. 1A, it will be noted that binary "1" is represented by a rectangular pulse in the positive direction, and the binary "0" by rectangular pulses which are negative-going. It is assumed in Fig. 1B that for the entire duration of the recording pulse the magnetic material is driven to saturation, the positive pulses producing saturation in the direction opposed to the bias or zero direction. It will be seen, therefore, that the signal pulses for "0" do not further affect the initial state of magnetization and only the "1" pulses effect a reversal of magnetization.

Let us now suppose in the next recording operation that a current pulse having the configuration of binary value 10001 is to be superimposed on the carrier over the previously applied value 10011. It will be seen that the basic difference in the recorded wave form appears at the fourth pulse time, as shown in Fig. 1C, for here a current pulse in the zero direction will flow.

This fourth pulse in the magnetic material biased in the "1" direction would produce a flux pattern similar to the one shown in Fig. 1D. Since, however, the flux pattern on which the new configuration is recorded is the one of Fig. 1B, the magnetized area as shown in Fig. 1E will not be entirely restored to the old bias level but instead the wave form shown in Fig. 1F will result in which the two small pips constitute noise.

Fig. 1G shows the idealized playback voltage and Fig. 1I is a more realistic illustration of the wave form in which the limited frequency response of the playback head system reduces the noise amplitude. It is to be understood that the frequency response of the playback system is normally restricted to only a few hundred kilocycles and it tends therefore to discriminate against high frequency components in the signals.

In any event it will be seen how a good signal to noise ratio is difficult to achieve with standard return-to-zero recording systems. The use of strobing pulses, as illustrated in Fig. 1H, will somewhat improve the arrangement, but the optimum position of the strobing for the "1" configuration does not correspond to an optimum position for configuration "0."

Some advantage can be gained if the zero current pulses are made longer in time than the "1" current pulses, for in such a case the cuspids of the flux wave form are somewhat reduced in amplitude. They cannot however be entirely eliminated by considerably widening the zero current pulses without at the same time adversely affecting the adjacent information unless of course packing density is substantially reduced to retain the original width of the information.

Figure 2:
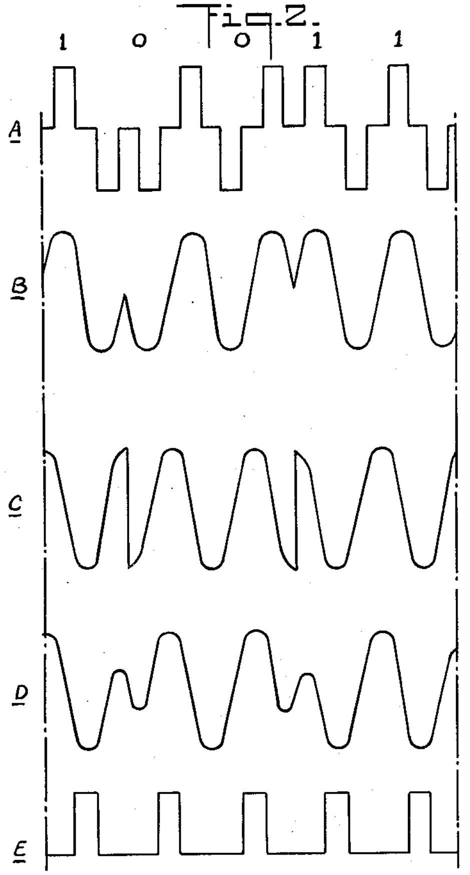

In the phase modulation system for digital recording, superior results can be achieved as far as signal-to-noise ratio is concerned. In this system, as shown in Fig. 2A with respect to binary value 10011, a current pulse in one direction is immediately followed by a current overshoot in the opposite direction. It will be seen that the positive-going pulses representing "1" are followed by negative-going pulses and conversely, the negative-going pulses representing "0" are followed by positive pulses. As a result, in the area between the pulse and its overshoot, the flux pattern, as shown in Fig. 2B, exhibits a point of flexure in the negative or in the positive direction, according to whether a "1" or a "0" is recorded. Consequently, the playback wave form which is the derivative of the flux will display a peak in one case and a valley in the other.

Fig. 2C shows the idealized playback waveform, whereas Fig. 2D is a more realistic presentation of the waveform. In the case of phase-modulation system, strobing pulses are necessary. These pulses are shown in Fig. 2E and it will be seen that they are coincident in time with the "1" and "0" binary pulses.

Figure 3:
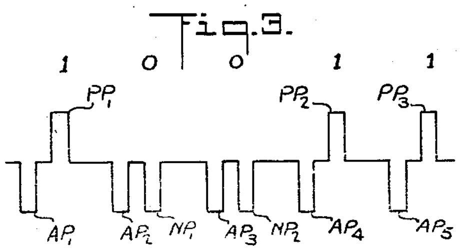
Fig. 3 is a wave form illustrative of the modified return-to-zero system in accordance with the invention.

The system in accordance with the invention involves recording binary information in the manner of a standard return-to-zero system in conjunction with a series of current pulses interlaced with the information pulses as shown in Fig. 3.

In Fig. 3, the binary value 10011 is represented, the value being constituted in time sequence by positive pulse $PP_1$ negative pulse $NP_1$, negative pulse $NP_2$, positive pulse $PP_2$ and positive pulse $PP_3$. Preceding each binary pulse by a short period of time is an additional pulse, the additional pulses $AP_1$ to $AP_5$ appearing continuously in the zero direction.

Because the additional pulse AP precedes the information pulse by a short period of time, it is obvious that if a "1" pulse follows, this will saturate the magnetic material in a positive direction independently from the previous cancellation caused by the additional pulse. On the other hand, if a zero pulse follows, the cancellation will be more complete. The signal-to-noise ratio thereby obtained is as good as that effected with the phase-modulation system. However playback waveforms are not independent from a previously biased condition and in point of fact it has been found that best results are attained by first biasing the magnetic drum to saturation in the zero direction.

Figure 4:
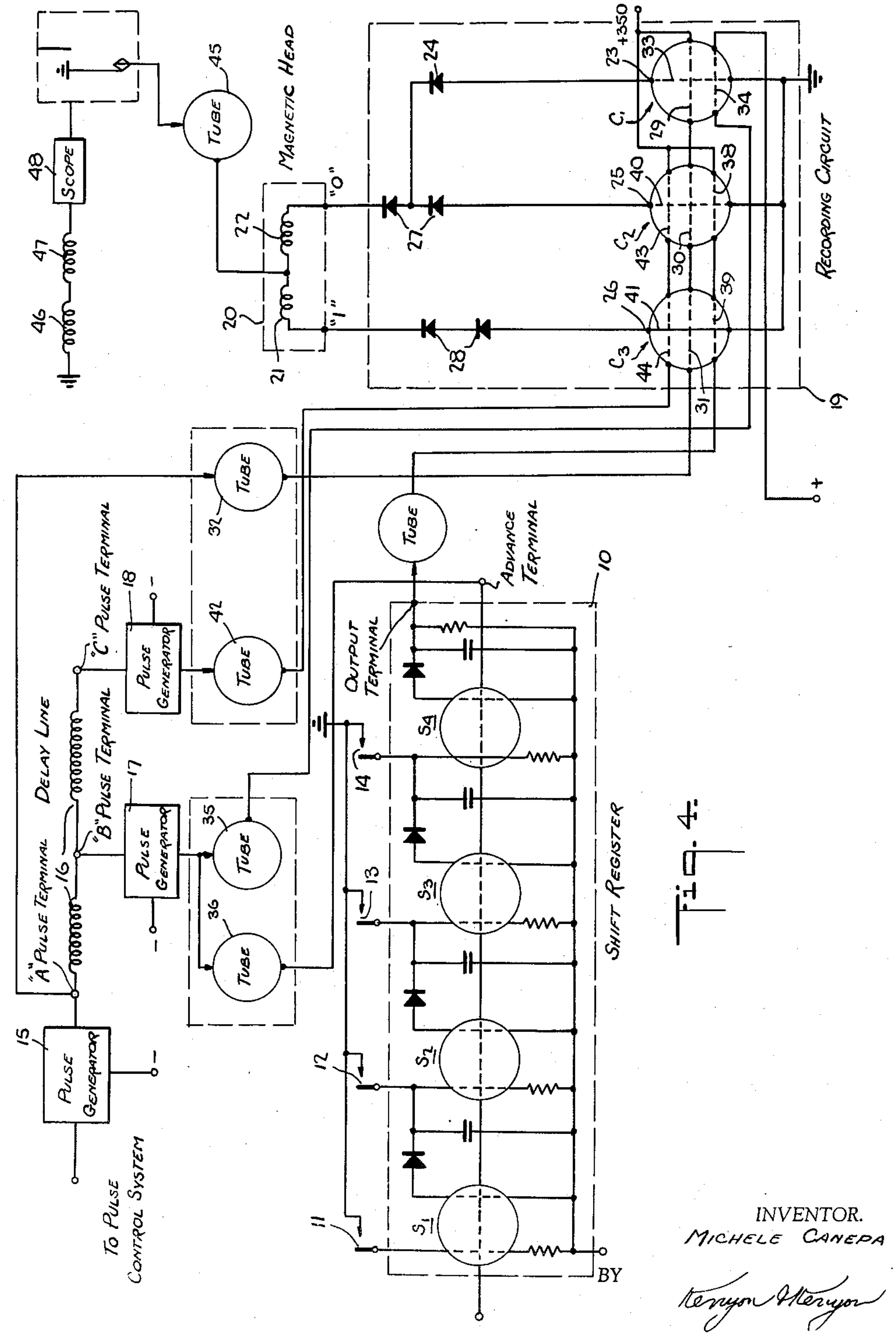
Fig. 4 is a schematic circuit diagram of an arrangement for producing the modified return-to-zero recording pulses.

Reference is now made to Fig. 4 showing the circuit arrangement of a preferred embodiment of the invention. This circuit is designed to record pulse patterns constituted by four bit combinations, and for this purpose the information to be recorded is entered into a four core shift register of conventional design, generally designated by numeral 10, and including a series of four stages $S_1$, $S_2$, $S_3$ and $S_4$. The stages are provided with switches 11, 12, 13 and 14 respectively, which switches may be simultaneously operated to enter in the four bit combination of input information, this being done at a time before advance pulses are applied to the cores to shift the information.

Figure 5:
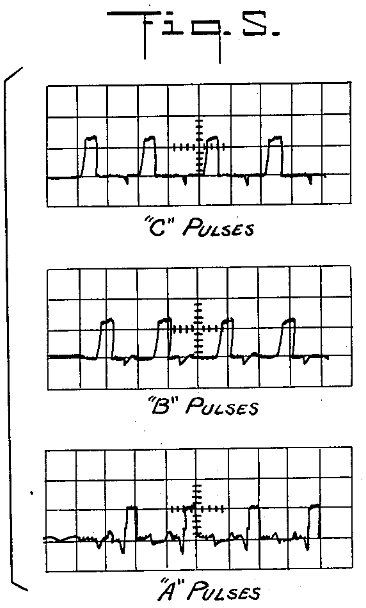
Fig. 5 illustrates three trains of tuning pulses operated in the circuit shown in Fig. 4.

By means of a switching arrangement of any suitable design (not shown in Fig. 4) timing pulse trains A, B and C are generated in synchronism with the rotating drum and in such a way that recording always takes place in the same physical position on the rotating surface. Pulse trains A, B and C are constituted by a set of four pulses each, as shown in Fig. 5, the sets of pulses being displaced in time relation to each other. The time relation between successive pulses A, B and C may be more clearly observed in Fig. 6, and it will be seen in this example that the pulses have a duration of 1.5 microseconds, pulse B being displaced 2.5 microseconds from pulse A, and pulse C being displaced 1 microsecond from pulse B, the next succession of pulses occurring 1 microsecond later. The invention is of course not limited to the specified time intervals.

Pulse generator 15 generates the train of pulses A. These are delivered into a delay line 16 and by tapping the output of the line at intermediate points, the desired displacement between the pulse trains is obtained. The outputs from the line are reshaped by means of pulse generators 17 and 18 to produce pulse trains B and C.

As noted previously, after entering the information to be recorded into the shift register 10 by operation of switches 11 to 14, and thereafter actuating a "record" switch acting on generator 15, the sets of A, B and C pulses are generated only once and in relation to a definite physical position of the drum.

Cores $C_1$, $C_2$ and $C_3$ of a recording circuit 19 are used to perform the recording operations directly on a magnetic head 20. Head 20 in addition to a core having a gap includes a pair of coils 21 and 22 through which current flows in opposing directions to record "1" bits and "0" bits, respectively.

Cores $C_1$, $C_2$ and $C_3$ are preferably made of ferrite material and are of the square hysteresis loop type. The cores are provided with coils, as indicated by the dash-lines. It will be seen that core $C_1$ is used to generate the set of additional pulses which are timed to occur coincidentally with the train of four B pulses. The output wave form taken at point 23 of core $C_1$ can be seen in the lowermost portion of Fig. 7 for output combinations 0000 and 1111. Since the additional pulses are recorded only in the "0" direction, the output from core $C_1$ is connected through a diode 24 to the "0" line going to coil 22 in the head 20. Cores $C_2$ and $C_3$ are employed to generate the "0" and "1" information respectively and are wired in a trigger pair core arrangement. The output of these cores, as taken at points 25 and 26, can also be seen in Fig. 7 for output combinations 0000 and 1111, the output of core $C_2$ being applied to the "0" bus through a pair of series-connected diodes 27 and the output of core $C_3$ being applied through a pair of series-connected diodes 28 to the "1" bus.

It will be seen that the corresponding coils 29, 30 and 31 wound on cores $C_1$, $C_2$ and $C_3$ are serially-connected through a control tube 32 to the "A" pulse output terminal of pulse generator 15. At the time marked by the A pulse, cores $C_1$ and $C_2$ are set to the "1" state while core 3 is set to the "0" state.

At the succeeding time point marked by pulse "B" core $C_1$ is reset and the output of coil $C_1$ taken at terminal 23 from output coil 33 is recorded in the zero direction on the magnetic head 20. It will be seen the "B" pulse is applied to reset coil 34 of core $C_1$ through control tube 35 coupled to the "B" pulse generator 17. At the same time the "B" pulse is applied through control tube 36 to the shift register 10 to advance same whereby the output of the last stage $S_4$ of the shift register is entered into cores $C_2$ and $C_3$ of the recording circuit through control tube 37 through serially-connected coils 38 and 39.

The arrangement is such that if a "1" is read out of the shift register 10, core $C_2$ is reset to "0," while core $C_3$ is simultaneously set to "1," which means that if a "1" is read into the cores, the status of cores 2 and 3 is thereby reversed. On the other hand, if no pulse is read from the shift register, the situation in cores 2 and 3 remains unaltered. An output pulse is read out from output coil 40 of core $C_2$ at "B" time whenever a "1" pulse from the shift register is read therein, but this output pulse is sent to the coil 22 of the magnetic head in parallel with the output from core $C_1$, which is generated also at "B" time.

Figure 6:
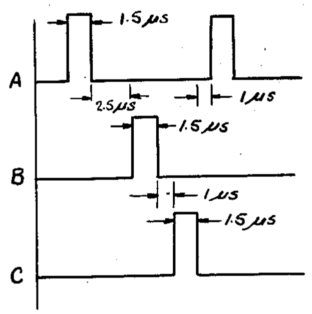
Fig. 6 shows the time relation among the three trains of pulses.

Finally at "C" time, the information is recorded from the output coil 40 of core $C_2$ into the "0" bus going to coil 22 in the head in the case of a "0," or from the output coil 41 of core $C_3$ into the "1" bus going to coil 21 in the case of a "1." The "C" pulses which appear in the output of generator 18 occur as shown in Fig. 6 at a brief interval after the "B" pulses. The "C" pulses are applied through control tube 42 to the serially-connected coils 43 and 44 on cores $C_2$ and $C_3$, respectively.

Figure 7:
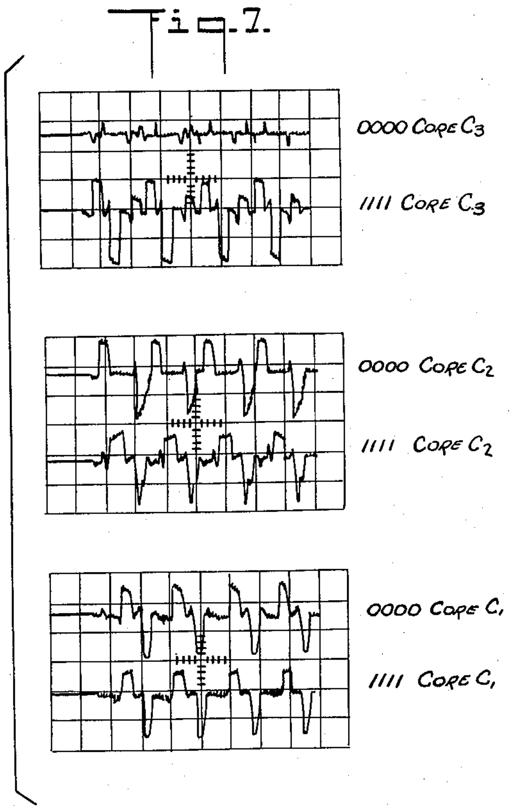
Fig. 7 shows the wave form developed at the output of the cores in the recording circuit in Fig. 4.
Figure 11:
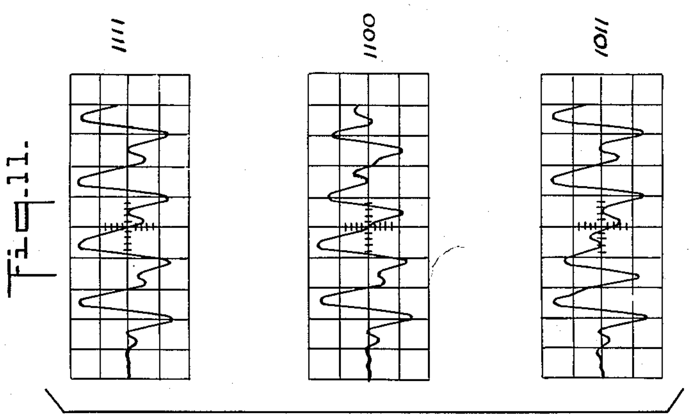
Figure 10:
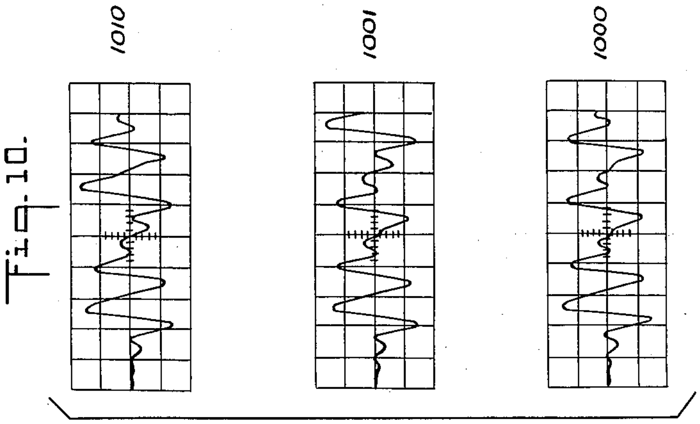
Figure 9:
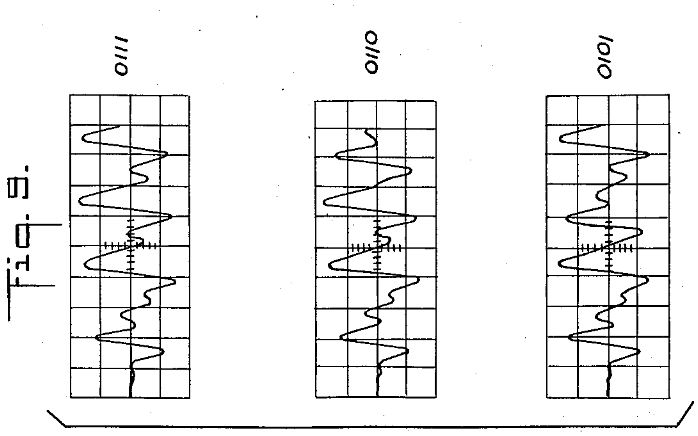

A more detailed description of a trigger pair circuit including magnetic cores having four windings thereon may be found in the Canepa patent application, Serial No. 498,694, filed April 1, 1955, now United States Patent No. 2,834,004, issued May 6, 1958. In Fig. 7, the output waveforms from cores 1, 2 and 3 are shown for configurations 0000 and 1111 and it can easily be verified that the pulse patterns are as described.

The following is a summary of the sequence of operations:

*Timing pulse A.*—Cores $C_1$ and $C_2$ set to "1" state. Core 3 set to "0" state.

*Timing pulse B.*—Core $C_1$ is reset to "0," and output is recorded in zero direction. Shift register is advanced whereby information is entered into cores $C_2$ and $C_3$. If information entered is "1," core $C_2$ resets to "0," core $C_3$ set to "1." If information entered is "0," core $C_2$ remains set to "1" and $C_3$ remains set to "0."

*Timing pulse C.*—Information held in cores $C_2$ and $C_3$ is recorded.

A control vacuum tube 45 is used as a selecting unit for the magnetic head 20, the tube including a control grid as well as a cathode and plate. The cathode plate circuit of the tube is connected between ground and the junction of windings 21 and 22 of the head. When the grid is placed at cathode potential, the tube 45 is rendered operative to send current through the selected head and through the tube which in this condition offers a relatively low resistance. When the tube is cut off, practically no current flows through the tube, the only current flow into the head being leakage current through the back of the diodes (diodes 24, etc.) in the recording circuit. From this point of view it will be observed in Fig. 7 that a +B time when a "1" is to be recorded, approximately 300 volts are applied on the back direction across the diodes 28 in the "1" bus. Diodes of proper characteristics must therefore be used.

Playback waveforms may be obtained by means of an independent magnetic head, as shown in Fig. 4, which may be of the same design as the recording head and includes coils 46 and 47 connected serially with respect to an oscilloscope 48 which is used in this case to exhibit the nature of the playback signals. The playback waveforms are shown in Figs. 8, 9, 10 and 11, which are based on photographs taken from oscilloscope. The time axis must be considered to move from right to left, the reversal with respect to the oscilloscope being due to the camera. This reversal also applies to Figs. 5 and 7.

Figure 8:
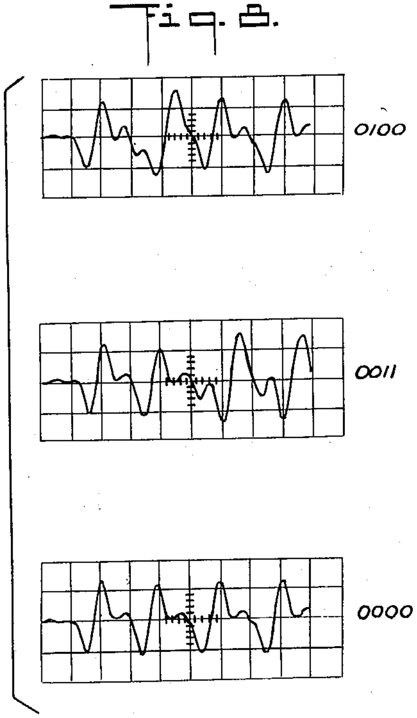
Figs. 8 to 11 show various playback wave forms resulting when recording in a modified return-to-zero system.

The sequence of operations is as follows: First the drum was biased to saturation, by means of a permanent magnet, in the zero direction. Thereafter, as shown in Fig. 8, configuration 0000 was recorded, configuration 0011 was recorded above 0000, then 0100 on the top of 0011, etc.

Strobing pulses are necessary in the present system, the position of these pulses on the time axis for Figs. 8 to 11 with respect to the center being: −3 cm. for binary 8, −1 cm. for binary 4, +1 cm. for binary 2 and +3 cm. for binary 1.

Figure 12:
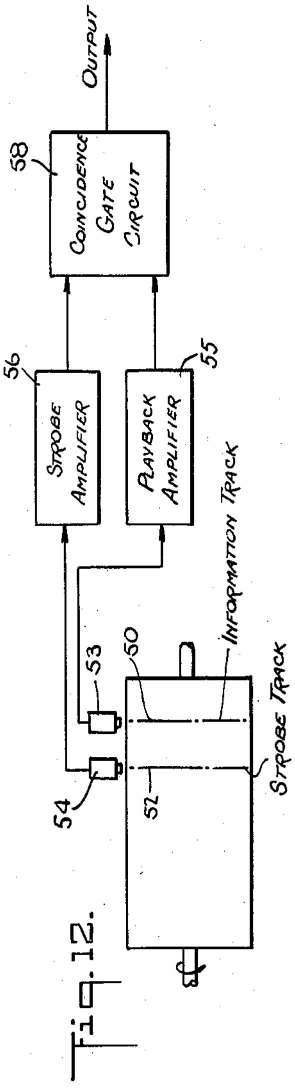
Fig. 12 is a block diagram of the playback arrangement.

A playback arrangement suitable for the digital recording system in accordance with the invention is shown in Fig. 12 wherein modified return-to-zero signals are magnetically recorded on a track 50 of a recording drum 51, and appropriate strobing signals are magnetically recorded on a track 52. The invention is of course not limited to drum recording.

The signals are intercepted by means of a pick-up head 53 associated with track 51 and a second pick-up head 54 associated with track 52. In order to obtain the desired synchronization of strobing pulses with signaling pulses, the circumferential position of the head 54 may be adjusted relative to head 50 until the proper time relation is established. The outputs of heads 53 and 54 are coupled to playback and strobe pulse amplifiers 55 and 56, respectively. The outputs of the amplifiers are fed to a coincidence or gate circuit 58 of any suitable design which acts to produce an output only when a strobe pulse and a signal pulse representing a "1" appear coincidentally, whereby no output is obtained as a result of noise or other signal pulses which appear at other time positions relative to the strobe pulses.

It will be understood that the invention is not limited to the specific circuit in Fig. 4. For example, the additional pulses and the binary pulses may be generated in separate circuits, rather than in a common recording circuit as shown, and outputs of the two circuits may be fed to the recording head with the desired time spacing between the additional pulses and the binary pulses.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. Apparatus for magnetically recording binary information by applying pulses to a recording head acting in conjunction with a magnetic medium comprising means to convert the bits of binary information into a train of binary pulses in which "1" values are represented by pulses of one polarity and "0" values by pulses of the opposite polarity, means to apply said pulse train to said head to effect magnetic recording, and means to apply a train of additional pulses to said head, all of said additional pulses having the same polarity as said "0" pulses, said additional pulses being interlaced in time relative to said binary pulses whereby each binary pulse is preceded by an additional pulse.

2. Digital recording apparatus comprising a magnetic recording head, a magnetic medium movable past said head, a shift register responsive to bits of binary information applied thereto to produie a serial train of pulses in which "1" values are represented by positive pulses and "0" values by negative pulses, a source of additional pulses of negative polarity, and means to apply said train of pulses to said head in interlaced relation with said additional pulses all of negative polarity whereby each binary pulse is preceded in time by an additional pulse.

3. Digital recording apparatus comprising a magnetic recording head, a magnetic medium movable past said head, means to effect saturation of said medium in a given direction before it arrives at said head, means to apply to said head pulses representative of binary information to effect saturation of said medium in the reverse direction in response to "1" values and in said given direction in response to "0" values, and means to apply to said head an additional pulse preceding each binary pulse to effect saturation of said medium in said given direction.

References Cited in the file of this patent

UNITED STATES PATENTS

| | | |
|---|---|---|
| 2,547,001 | Greig | Apr. 3, 1951 |
| 2,719,773 | Karnaugh | Oct. 4, 1955 |
| 2,764,463 | Lubkin et al. | Sept. 25, 1956 |
| 2,850,234 | Barttelt et al. | Sept. 2, 1958 |

FOREIGN PATENTS

| | | |
|---|---|---|
| 162,314 | Australia | Mar. 31, 1955 |